United States Patent

[11] 3,622,178

| [72] | Inventors | Keith W. Tantlinger<br>Grosse Pointe Shores;<br>George Chieger, Birmingham; Adam D.<br>Sweda, Grosse Pointe Farms, all of Mich. |
|---|---|---|
| [21] | Appl. No. | 840,328 |
| [22] | Filed | July 9, 1969 |
| [45] | Patented | Nov. 23, 1971 |
| [73] | Assignee | Fruehauf Corporation<br>Detroit, Mich. |

[54] LONGITUDINALLY MOVABLE LANDING GEAR FOR TRAILERS AND THE LIKE
7 Claims, 11 Drawing Figs.

[52] U.S. Cl. ................................................ 280/150.5,
254/86, 280/81, 280/106 T, 280/415 A
[51] Int. Cl. .................................................. B60s 9/00
[50] Field of Search .......................................... 280/80,
415, 415.1, 415.3, 150, 150.5, DIG. 8

[56] References Cited
UNITED STATES PATENTS

| 2,710,201 | 6/1955 | Winn | 280/430 |
| 3,061,332 | 10/1962 | Goulden | 280/415 |
| 3,089,711 | 5/1963 | Tantlinger et al. | 280/150.5 |
| 3,096,993 | 7/1963 | McKay | 280/80 UX |
| 3,101,202 | 8/1963 | Tantlinger et al. | 280/415 |
| 3,253,839 | 5/1966 | Warren | 280/150.5 |
| 3,259,400 | 7/1966 | Tantlinger et al. | 280/423 |
| 3,317,219 | 5/1967 | Hindin et al. | 280/415 |

Primary Examiner—Benjamin Hersh
Assistant Examiner—Winston H. Douglas
Attorney—Harness, Dickey & Pierce ABSTRACT: The landing gear for a container chassis frame is movable to and from ground-engaged position and when the bogies for the wheels are to be shifted to different positions on coupled and uncoupled frames, the landing gear may also be shifted to conform to the new position of the wheels.

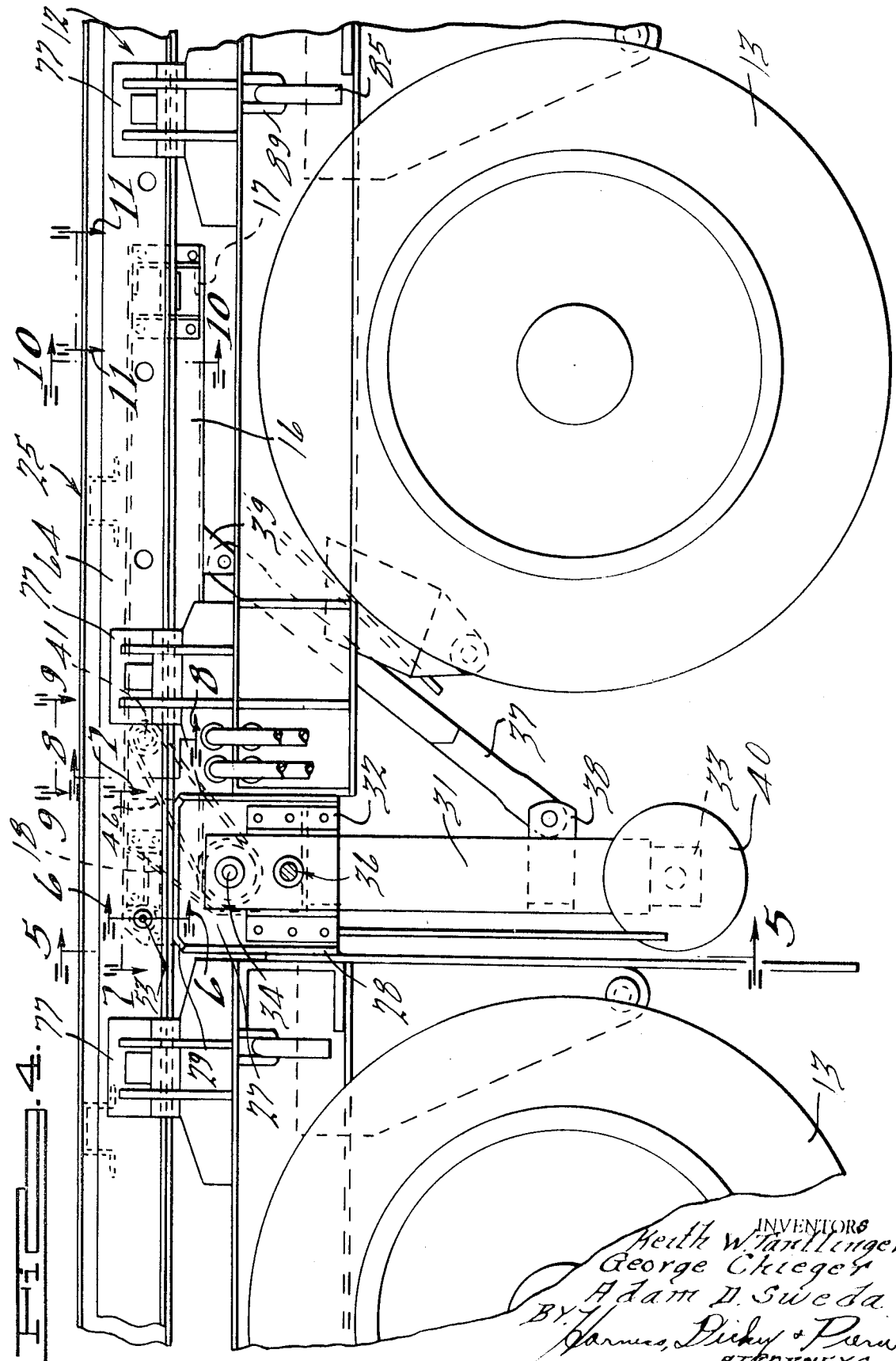

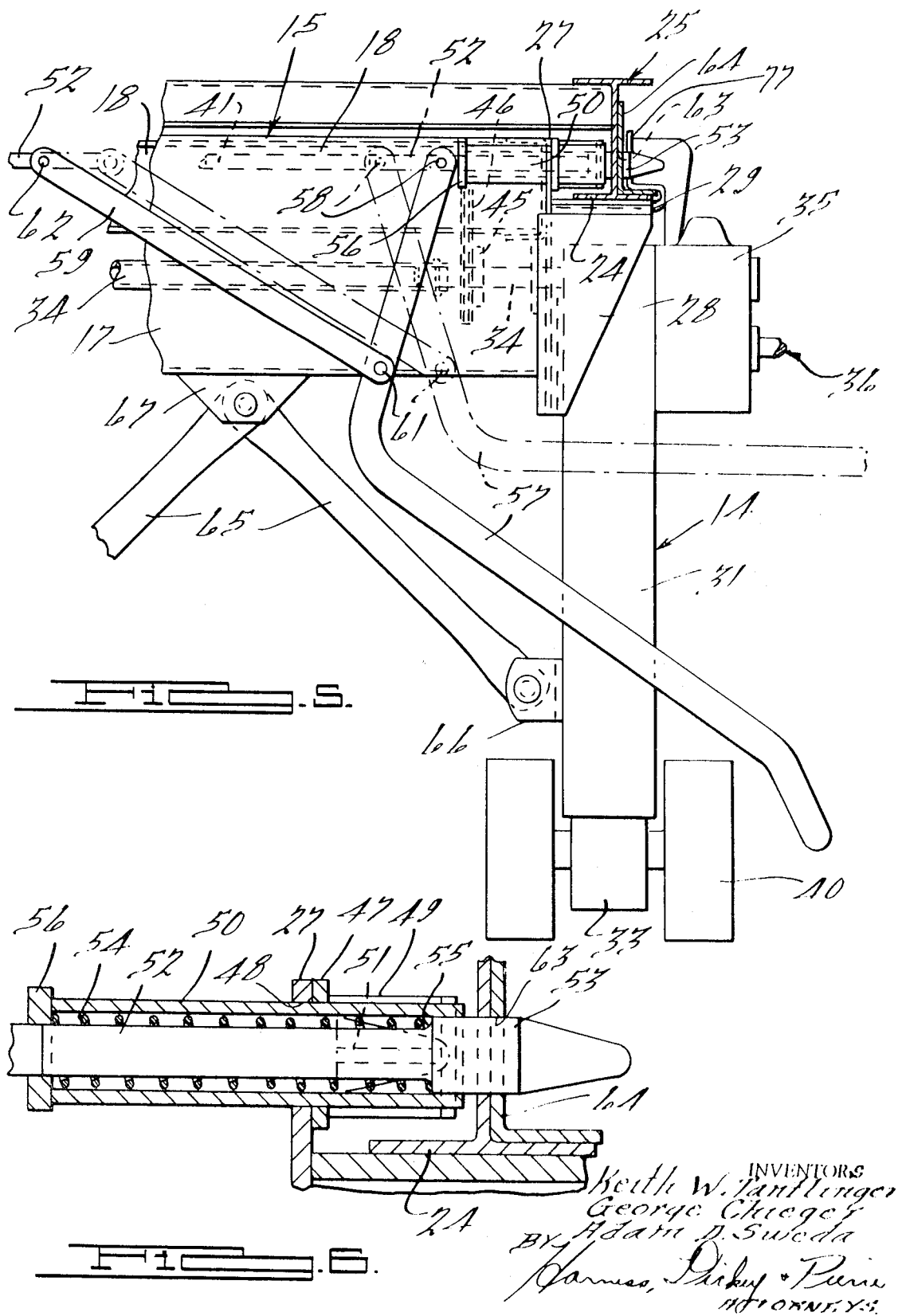

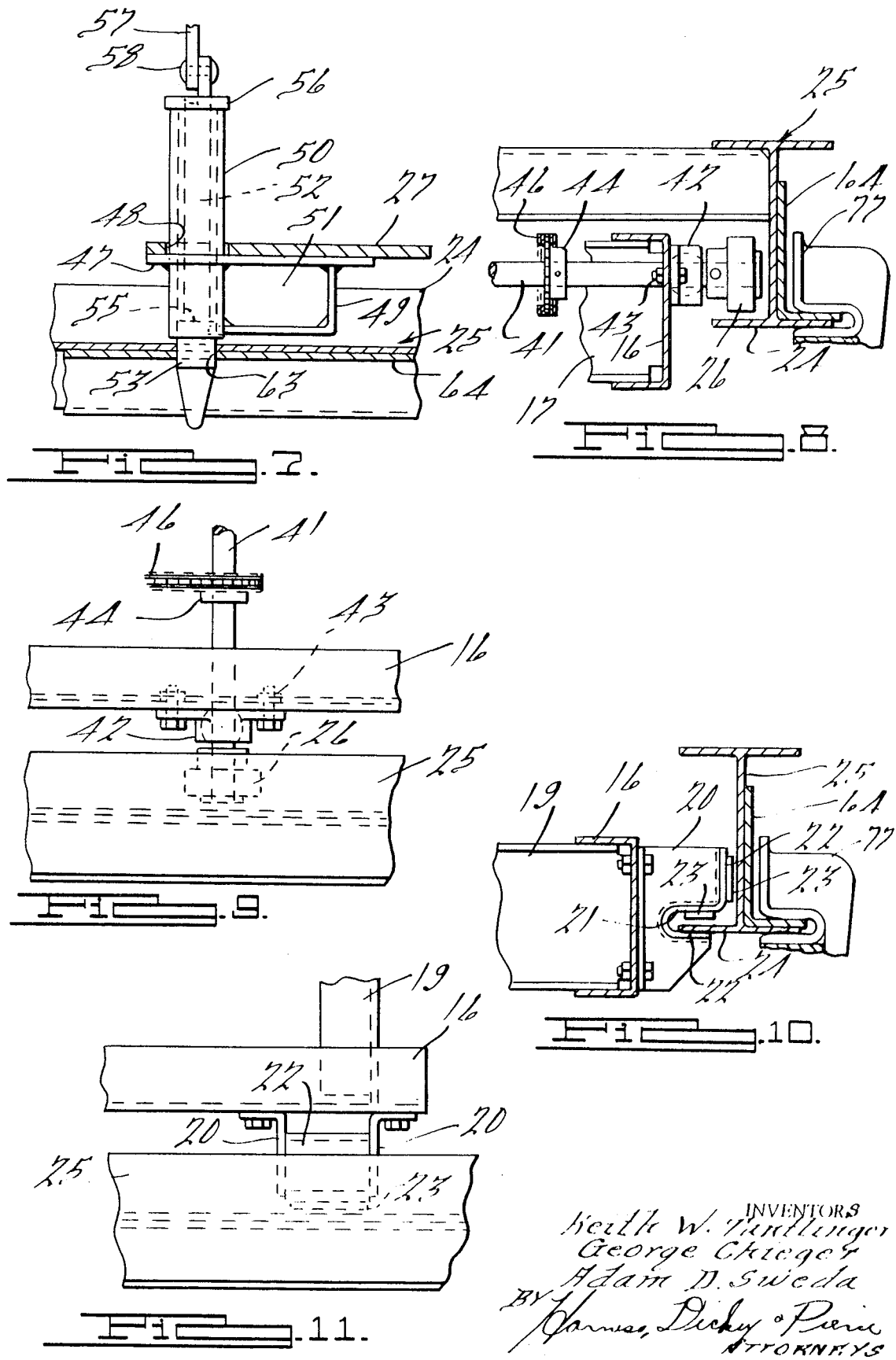

3,622,178

LONGITUDINALLY MOVABLE LANDING GEAR FOR TRAILERS AND THE LIKE

BACKGROUND OF THE INVENTION

Reference may be had to the Warren U.S. Pat. No. 3,253,839 for a disclosure of retractable landing gears which may be shifted longitudinally of the body over which the present invention is an improvement.

RELATED APPLICATION

Reference may be had to the patent to Keith W. Tantlinger and George Chieger, U.S. Pat. No. 3,537,727, for "coupled chassis" showing a similar concept.

SUMMARY OF THE INVENTION

The invention pertains to a slidable landing gear frame carried on the side rails of a chassis frame of a trailer which has wheels supported thereon for movement to and from the ground. A crank is employed for rotating a shaft which raises or lowers the wheels from and to the ground for supporting the front end of the chassis frame when in ground engagement. The rails at the sides of the chassis frame are I-beams which form a trackway for rubber-rimmed wheels carried by the slidable frame of the landing gear which are rotated by sprocket wheels and chain drive from the cross-shaft which raises and lowers the wheels of the landing gear. When the landing gear wheels are in ground-engaged position, the I-beams rest upon the landing gear frame with the slidable frame rubber-rimmed wheels raised from the trackways. A pair of pins having tapered ends are operated by a lever system to connect the slidable landing gear frame to the I-beams when the pins are advanced through apertures therein. When the pins are in this position the operation of the crank will raise and lower the landing gear wheels from and to the ground without moving the slidable frame even though the rubber-rimmed wheels thereof are being driven since they are out of engagement with the trackways.

When the landing gear is to be shifted rearwardly on the chassis frame to a position between the two wheel bogies when moved to tandem relation to each other, the pins are retracted by the operation of the lever system and the crank is operated to raise the landing gear wheels from the ground which lowers the rubber-rimmed wheels of the slidable frame into engagement with the trackways. The continued rotation of the crank for raising the wheels of the landing gear simultaneously rotates the slidable frame rubber-rimmed wheels and moves the frame and landing gear along the I-beam chassis rails to a selected position. The diameters of the sprocket wheels and driving wheels are such that the desired longitudinal movement of the slidable frame will occur within the movement required to raise the landing gear wheels to fully retracted position. When the landing gear has been moved to the rear, it may be employed as a jack for raising the rear portion of the chassis frame so that a bogie may be moved thereunder or therefrom or for the purpose of having a tire changed. The landing gear may be moved forwardly a maximum amount at the front end to provide stability to prevent forward tilting when the frame is uncoupled from the tractor

BRIEF DESCRIPTION OF THE DRAWINGS

FIG. 4 is a broken view in side elevation of the rear end of the rear of two joined chassis frames showing the landing gear located between the two running wheels which are in tandem relation;

FIG. 5 is an enlarged broken sectional view of the structure illustrated in FIG. 4, taken on the line 5—5 thereof;

FIG. 6 is an enlarged broken sectional view of the structure illustrated in FIG. 4, taken on the line 6—6 thereof;

FIG. 7 is an enlarged broken sectional view of the structure illustrated in FIG. 4, taken on the line 7—7 thereof;

FIG. 8 is an enlarged broken sectional view of the structure illustrated in FIG. 4, taken on the line 8—8 thereof;

FIG. 9 is an enlarged broken sectional view of the structure illustrated in FIG. 4, as viewed from line 9—9 thereof;

FIG. 10 is an enlarged broken sectional view of the structure illustrated in FIG. 4, taken on the line 10—10 thereof, and FIG. 11 is an enlarged broken view of the structure illustrated in FIG. 10, as viewed from line 11—11 thereof.

DESCRIPTION OF THE PREFERRED EMBODIMENT

Figure 1:
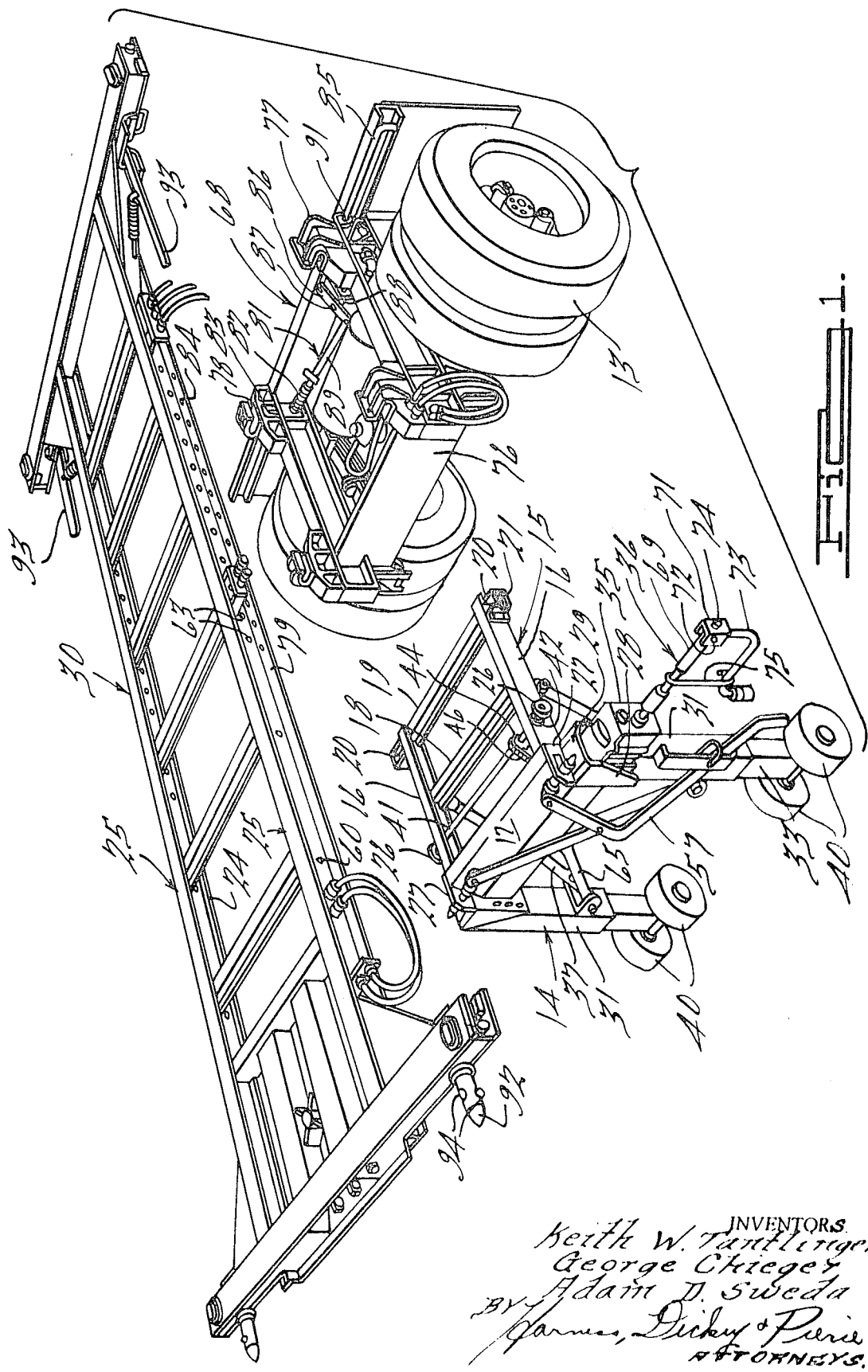
FIG. 1 is an exploded perspective view of a chassis frame, the running-wheeled bogie and the landing gear frame in separated relation, embodying features of the present invention.

In the above-set-forth patent, a pair of chassis frames are illustrated with bodies or containers thereon shown in dot and dash lines. Each frame has a shiftable bogie with a wheel at each side at the rear and a landing gear at the front which are adjustable toward and away from each other on the frame. It will be noted in FIG. 2 of the set-forth patent that when the frames are connected together, the wheels are moved to tandem relationship on the rear frame and the landing gear of the rear frame is shifted rearwardly to be disposed between the tandem wheels. The frames are of the same construction and either one can be coupled ahead of the other the same as in the present construction.

In practicing the present invention, a landing gear 14 is supported on a frame 15 made up of two inwardly presenting side channel elements 16 connected by a forward bolster 17, a central crossmember 18 and a rear crossmember 19. The rear end of the side channel elements 16 has a bracket 20 secured outwardly thereof containing a slot 21 in which a reversely bent plate 22 is secured. Blocks 23 of low-friction material are secured to the plate 22 in position to engage the top surface of the inner face of a bottom flange 24 and the inner face of the web of I-beams 25 located at the dies of a chassis frame 30 when the bottom flanges 24 extend within the slots 21. The top surface of the flanges 24 also forms a trackway on which rubber-rimmed wheels 26 on the frame 15 are driven. The forward end of the channel elements 16 carry vertical plates 27 to which sideplates 28 are secured which are bridged at the top by a plate 29. A square tubular element 31 is secured by brackets 32 to the plates 27. Each tube 31 supports a reciprocal member 33 to which rotatable ground-engaging wheels 40 are secured. A lead screw (not shown) within the tube 31 raises and lowers the member 33 driven from a shaft 34 drivenly connected by bevel gears or other suitable driving means. Gearboxes 35 on the tubular elements 31 have the gears thereof operated by a crank structure 36 which drives the shaft 34. A link 37 is connected to a bracket 38 on the tubular element 31 and to a bracket 39 on the frame 15 to brace the tubular element against forward and rearward movement.

Figure 2:
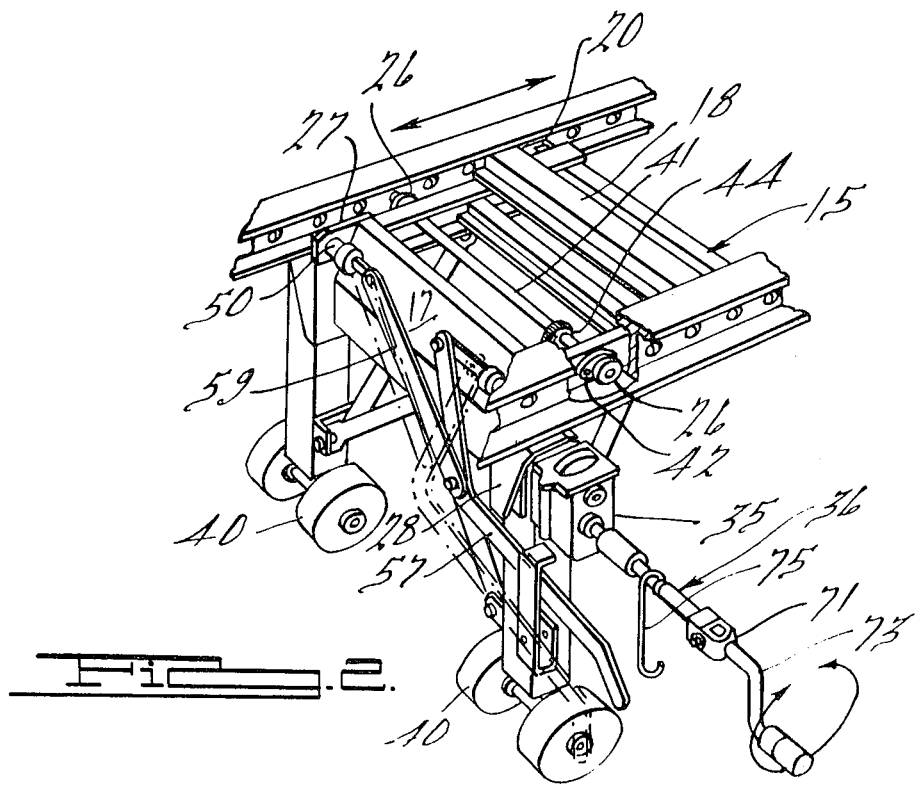
FIG. 2 is a view of the landing gear structure illustrated in FIG. 1 with the wheels thereof in raised position and the frame thereof released from the chassis frame.
Figure 3:
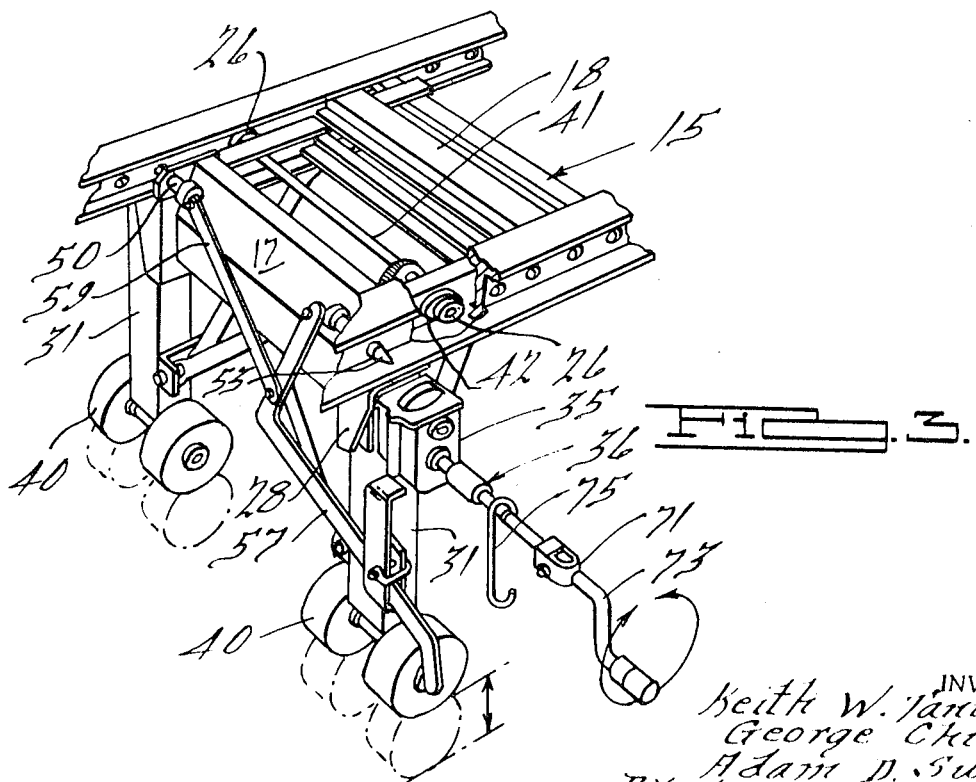
FIG. 3 is a view of the structure illustrated in FIG. 2 with the frame thereof locked to the chassis frame.

The frame 15 has a second shaft 41 extending between the channel element 16 and supported on bearings 42 secured thereto to bolts 43, as illustrated in FIG. 9. A sprocket wheel 44 is mounted on the shaft 41 in alignment with a sprocket wheel 45 on the shaft 34. A chain 46 interconnects the sprocket wheels 44 and 45 for driving the shaft 41 from the shaft 34. Each of the plates 27 has a plate 47 secured thereto which has an aperture therethrough aligned with an aperture 48 in the plate 27, as illustrated in FIG. 2. A sleeve 50 is welded within the aperture of the plate 47 and to the end of an L-shaped bracket 49 which is welded to the plate 47 and to a filler plate 51 therewithin. A plunger 52 has a tapered head 53 on the outer end which is of greater diameter than that of the body thereof. A spring 54 on the plunger body abuts a shoulder 55 of the head and a washer 56 at the opposite end of the sleeve.

An L-shaped operating lever 57 has one end secured to the right-hand plunger 52, as viewed in FIG. 5, by a pin 58. A link 59 is secured by a pivot 61 to the L-shaped lever 57 and by a pin 62 to the plunger 52 on the left-hand side of the frame. When the L-shaped lever 57 is moved from full-line position to the dotted line position of the figure, one and the other of the plungers 52 will be retracted to withdraw the tapered heads 53 from apertures 63 through the I-beam 25 and an angle-reinforcing element 64 extending therealong which provides additional strength to the wheel-supporting portion thereof. The apertures 63 are provided along the I-beam so that the pin can engage in various positions therealong. A forwardmost aperture 60 permits the landing gear to be moved to a forwardmost position at which stability is provided to the frame when used for supporting a 20-foot container to prevent the forward tilting thereof. The tubular elements 31 are further reinforced against movement toward and away from each other by links 65 secured to brackets 66 thereon and to a bracket 67 on the bolster 17.

When the frame 15 is supported by the landing gear wheels 40 from the ground, the wheels 26 are out of contact with the flange 24 of the I-beams 25. This is also true when the heads 53 of the plungers 52 extend through the aperture 63 of the I-beam 25 and reinforcing element 64. The crank structure 36 may be operated to raise the wheels 40 from the ground in the conventional manner as the wheels 26 will be out of contact with the flanges 24 and the plunger heads 53 will extend within the aperture 63 to lock the frame against movement. In this relation, the wheels 26 will be driven through the sprocket wheels 44 and 45 and the chain 46 each time the extending members 33 are moved into or out of the tubular elements 31 upon the operation of the crank structure 36.

When the landing gear has the wheels 40 thereof moved into ground engagement the frame 15 will be moved upwardly to have the plates 29 engage the bottom flanges of the I-beams 25 for supporting the forward end of the chassis frame. In this position the heads 53 of the plungers 52 can be inserted in the apertures 63 to lock the frame 15 to the chassis frame 30. When it is desired however to shift the landing gear from the position illustrated in FIG. 1 on the front end of the frame 30 to a rear position between the wheels on a pair of bogies 68, as illustrated in FIG. 4, the lever 57 is pulled upwardly to retract the heads 53 of the plungers 52 from the apertures 63 in the I-beams 25 and reinforcing element 64. The operation of the crank structure 36 retracts the wheels 50 of the landing gear to have the forward end of the chassis frame supported on a tractor. The frame 15 and the plates 29 will be lowered to permit the rubber wheels 26 to engage the trackways or flanges 24 with which the blocks 23 on the remote end of the frame contact. The operation of the crank structure raises the wheels 40 from the ground and drives the wheels 26 through the sprockets 44 and 45 and chain 46 to slide the frame 15 longitudinally along the I-beams 25. The diameter of the wheels 26 and that of the sprocket wheels 44 and 45 are so related to the lead screw drive for retracting the extending members 33 that the desired movement of the frame 15 on the I-beams 25 will take place within the retractive movement. It will be noted in FIG. 4 that the bogie of the front frame was moved onto the rear frame to have the wheels thereof disposed in tandem relation to the wheels of the bogie on the rear frame with the landing gear therebetween and the frame thereof slid over the frame of the rear bogie.

The two chassis frames are secured together by pins 92 as disclosed in the above-mentioned patent. The rear end of the chassis frame 30, as illustrated in FIG. 1, has releasing levers 93 for retracting the clevis containing a pair of fingers which engage a pair of diametrically disposed transverse recesses 94 in the pins. The crank structure 36 embodies a shaft 69 extending from the gearcase 35 having a clevis 71 secured thereto by a bolt 74. This permits the handle to be pivoted beneath Xthe shaft 69 and secured in nested relation therewith when supported on a hook 75 which is pivoted on the shaft.

The landing gear may be moved rearwardly through forward movement of the chassis frame by the tractor by preventing forward movement of the landing gear as the chassis frame is moved forwardly. The rubber-rimmed wheels 26 in engagement with the flanges 24 will be driven by the advancing chassis frame to further raise the wheels 40 and rotate the shaft 36 and the handle 73. The handle however is supported on the hook 75 and will eliminate the hazard of having it rotated when extended. The frame 15 is stopped with the tapered end 53 of the plungers 52 aligned with opposite apertures 63 into which the are inserted upon the operation of the lever 57. Upon the operation of the lever 57 as pointed out above the frame 15 will be raised to raise the rubber-rimmed wheels 26 from the flanges 24 of the rails so that the wheels 40 may be lowered to function as a jack. This operation results since the centers of the pins 53 are disposed below the centers of apertures 63 when the wheels are in engagement with trackways. The chassis frame with its container, body or other load-carrying receptacle can be raised to permit the bogie to be shifted or removed, a new bogie applied or to have a tire on the wheel of the bogie changed even though the chassis frame is loaded. When the frame 15 of the landing gear is raised by the plungers 52 when extending through apertures 63, upon rotation of the shaft 36 to enable sufficient downward movement of the extending portions of the landing gear to cause the landing gear to function as a lifting jack the load on the frame is taken by the landing gear plates 29 on which the rails rest relieving the pins of the load and eliminating any wear thereon. This permits the ready insertion or withdrawal of the plungers 52 when the frame 15 is to be shifted fore or aft with the wheels 40 raised from the ground. The movement of the frame 15 forwardly on the rear chassis frame to a forward position thereon indicated by the apertures 60 permits the upward movement of the joined crossmembers of the frames in case the frames have been racked by the position of a wheel in a low spot in the ground. This moves the top ends of a pair of containers carried by the frames from abutment with each other when one or the other or both are to be removed from a coupled chassis frame.

The bogie 68 is of conventional form having a supporting frame 76 with aligned inwardly presenting U-shape brackets 77 on the top corners provided with slots 78 which engage the outwardly extending bottom flange 79 of the I-beam 25. This permits the bogie to be slid throughout the length of the flange 79 and off and onto the ends thereof. A bogie on a similar chassis frame 30 for a single container may be connected to the front end of the similar chassis frame illustrated and have the bogie thereof slid from its frame to the illustrated frame with the wheels of both bogies in tandem relation, as clearly illustrated in FIG. 4. A lever system 81 biased by a spring 82 actuates a pair of plungers 83 located in the rear brackets 77 for insertion in one of a plurality of longitudinally vertically spaced and oriented apertures 84 through the flanges 79. It will be noted that the brackets 20 on the end of the frame 15 of the landing gear are supported on the inner flange 24 of the I-beam 25 to permit the frame to move over the frame 76 of the bogie 68 and be disposed thereabove when the landing gear tubular elements 31 are disposed between the wheels 13 of the bogies as illustrated in the figure. The link system 81 is actuated by a rod 85 which pulls one end of a link 86 pivoted at 87 to a bracket 88 and pushes the other end thereof and a link 89 against the pressure of the spring 82 to release both of the plungers 83. A stop element, not shown, on the actuating rod 85 extends over a collar 91 and locks the plungers 83 in retracted position. The upward and inward movement of the rod 85 releases the stop element and permits the spring 82 to move the plungers 83 upwardly through one of the apertures 84 on the outwardly extending flanges 79 of the I-beam 25 to secure the bogie thereto.

We claim:

1. In a chassis frame having trackways at the sides, a horizontal frame slidably mounted on said trackways, a landing gear on said slidable frame having extending portions with ground-engaging means thereon, said extending portions being mounted for vertical movement relative to the slidable frame, a pair of drivable wheels on said slidable frame engageable with said trackways drive means carried by said landing gear for raising and lowering the extending portions thereof, means for driving said drive means, said slidable frame being raisable to a position wherein said driveable wheels are out of contact with said trackways when upon actuating said drive means there is sufficient downward movement of said extending portions to cause said landing gear to function as a lifting jack means thereby raising said slidable frame to said position, means for retaining said slidable frame fixed in said position to prevent any movement relative to the chassis frame, and additional drive means actuated by the landing gear drive means for simultaneously driving said drivable wheels of the slidable frame, so that upon releasing of said retaining means the operation of the landing gear drive means to raise the extending portions and the ground-engaging means from the ground lowers the slidable frame and engages the drivable wheels with the trackways which moves the frame rearwardly as the extending portions continue to be raised by the further operation of the landing gear drive means.

2. In a chassis frame as recited in claim 1, wherein said trackways are side rails each having a horizontal row of spaced aligned apertures, and extensible pins on said slidable frame which are insertable in selected of said apertures to retain the frame against movement along the trackways.

3. In a chassis frame as recited in claim 2, wherein said pins have tapered ends which when inserted in selected of said horizontal apertures raises said slidable frame which raises the driving wheels thereof from said trackways.

4. In a chassis frame as recited in claim 3, wherein said landing gear can function as a lifting jack when said sliding frame is raised by the pins when inserted in selected of said horizontal apertures.

5. In a chassis frame as recited in claim 2, wherein each of said trackways has a second set of apertures which are longitudinally spaced and vertically oriented, a bogie for running wheels slidably mounted on said chassis frame, and pins on said bogie insertable through selected of said second set of apertures for locking the bogie in different positions along the chassis frame.

6. In a chassis frame as recited in claim 5, wherein said side rails are of I-beam section and wherein the slidable frame has outwardly disposed slots into which the inner flange at the bottom of the I-beam extends and wherein the bogie has inwardly presented slots in which the outer flange at the bottom of the I-beam extends, the arrangement being such that the slidable frame is movable to a position above and within the bogie on the rear of the chassis frame.

7. In a chassis frame as recited in claim 1, wherein said landing gear drive means has a foldable operating handle which reduces its extension and the hazards thereof when rotated by the driveable wheels of the slidable frame when the chassis frame is moved while the slidable frame is retained stationary.

* * * * *

UNITED STATES PATENT OFFICE
CERTIFICATE OF CORRECTION

Patent No. 3,622,178            Dated    November 23, 1971

Inventor(s)    Keith W. Tantlinger et al.

It is certified that error appears in the above-identified patent and that said Letters Patent are hereby corrected as shown below:

Column 2, line 59, "to" should read -- by --; line 65, "2" should read -- 7 --. Column 3, line 44, "50" should read -- 40 --; line 69, after "secured" insert -- thereon by a pivot 72 and with an S-shaped handle 73 secured --. Column 4, line 9, "the" should read -- they --; lines 51 and 52, "vertically spaced and" should read -- spaced and vertically --. Claim 6, line 21, after "bogie" insert -- of the rear chassis frame --.

Signed and sealed this 4th day of July 1972.

(SEAL)
Attest:

EDWARD M. FLETCHER, JR.           ROBERT GOTTSCHALK
Attesting Officer                  Commissioner of Patents